(12) United States Patent
Anwar et al.

(10) Patent No.: US 9,998,615 B2
(45) Date of Patent: Jun. 12, 2018

(54) WEARABLE HELMET WITH INTEGRATED PERIPHERALS

(71) Applicant: FieldCast, LLC, Spokane, WA (US)

(72) Inventors: Saeed Z Anwar, Spokane, WA (US); Tenzing P. Tshering, New York, NY (US)

(73) Assignee: FIELDCAST LLC, Spokane, WA (US)

( * ) Notice: Subject to any disclaimer, the term of this patent is extended or adjusted under 35 U.S.C. 154(b) by 49 days.

(21) Appl. No.: 14/801,613

(22) Filed: Jul. 16, 2015

(65) Prior Publication Data

US 2016/0015109 A1 Jan. 21, 2016

Related U.S. Application Data

(63) Continuation-in-part of application No. 14/565,915, filed on Dec. 10, 2014, which is a continuation-in-part of application No. 14/612,671, filed on Feb. 3, 2015.

(60) Provisional application No. 62/059,378, filed on Oct. 3, 2014, provisional application No. 62/026,475, filed on Jul. 18, 2014.

(51) Int. Cl.

| | |
|---|---|
| *H04N 5/225* | (2006.01) |
| *H04N 5/232* | (2006.01) |
| *A42B 3/04* | (2006.01) |
| *H04N 1/00* | (2006.01) |
| *H04N 5/247* | (2006.01) |
| *H04N 7/18* | (2006.01) |

(Continued)

(52) U.S. Cl.
CPC ......... *H04N 1/00209* (2013.01); *A42B 3/042* (2013.01); *A42B 3/0433* (2013.01); *H04N 5/2253* (2013.01); *H04N 5/23241* (2013.01); *H04N 5/247* (2013.01); *H04N 7/181* (2013.01); *H04N 21/2187* (2013.01); *H04N 21/21805* (2013.01)

(58) Field of Classification Search
None
See application file for complete search history.

(56) References Cited

U.S. PATENT DOCUMENTS

| | | | | |
|---|---|---|---|---|
| 4,102,564 | A * | 7/1978 | Michael ................ | A61B 3/113 248/118 |
| 6,819,354 | B1 * | 11/2004 | Foster .................... | H04N 7/183 348/157 |

(Continued)

*Primary Examiner* — William C Vaughn, Jr.
*Assistant Examiner* — Lindsay Uhl
(74) *Attorney, Agent, or Firm* — Yuri L. Eliezer; Bekiares Eliezer LLP

(57) ABSTRACT

A wearable helmet system with integrated peripherals may be provided. In some embodiments, the integrated peripherals may be provided without a helmet, but configured to be adapted into a helmet to form a helmet system consistent with embodiments of the present disclosure. The helmet system may comprise a helmet adapted for sports play. The helmet may be integrated with a plurality of peripheral devices such as, for example, but not limited to, at least one camera configured to capture video data, at least one microphone configured to capture audio data, a communications module, a power module, and a processing module. The processing module is configured to control an operation of the integrated peripheral devices based on, for example, but not limited to, instructions received via the communications module and a location of the helmet.

20 Claims, 14 Drawing Sheets

(51) Int. Cl.
    *H04N 21/218*     (2011.01)
    *H04N 21/2187*    (2011.01)

(56) References Cited

U.S. PATENT DOCUMENTS

| | | | |
|---|---|---|---|
| 8,548,768 B2* | 10/2013 | Greenwald | A61B 5/0002 340/573.1 |
| 9,247,779 B1* | 2/2016 | Aloumanis | G08G 1/137 |
| 2011/0205022 A1* | 8/2011 | Cavallaro | A63B 24/0021 340/8.1 |
| 2012/0236544 A1* | 9/2012 | Dorman | A42B 3/0406 362/106 |
| 2013/0070047 A1 | 3/2013 | Digiovanni | |
| 2013/0182116 A1 | 7/2013 | Arima | |
| 2013/0215281 A1* | 8/2013 | Hobby | G06F 3/005 348/207.1 |
| 2013/0303248 A1 | 11/2013 | Williams | |
| 2014/0294366 A1* | 10/2014 | Fletchall | H04N 13/0055 386/341 |
| 2014/0304891 A1* | 10/2014 | Waters | A42B 1/24 2/209.13 |
| 2015/0085133 A1* | 3/2015 | Teich | H04N 5/332 348/159 |
| 2015/0177597 A1* | 6/2015 | Harrison | G03B 17/561 396/419 |
| 2015/0189176 A1* | 7/2015 | Pacurariu | H04N 5/23241 348/143 |

\* cited by examiner

Thermo plastic housing with a circular whole. This may be part of the internal mold. Thermo plastic housing may keep camera steady against helmet sheild.

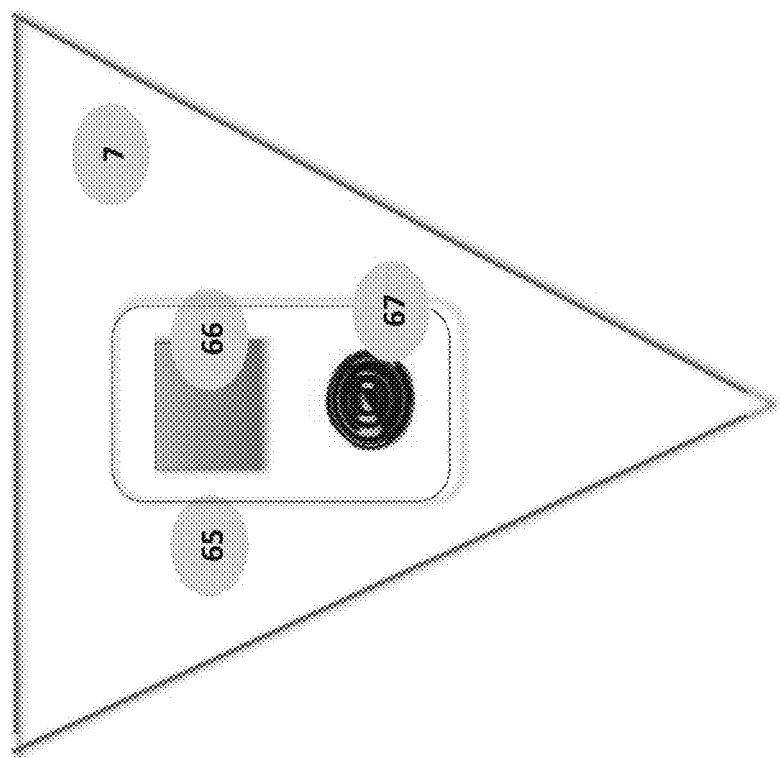

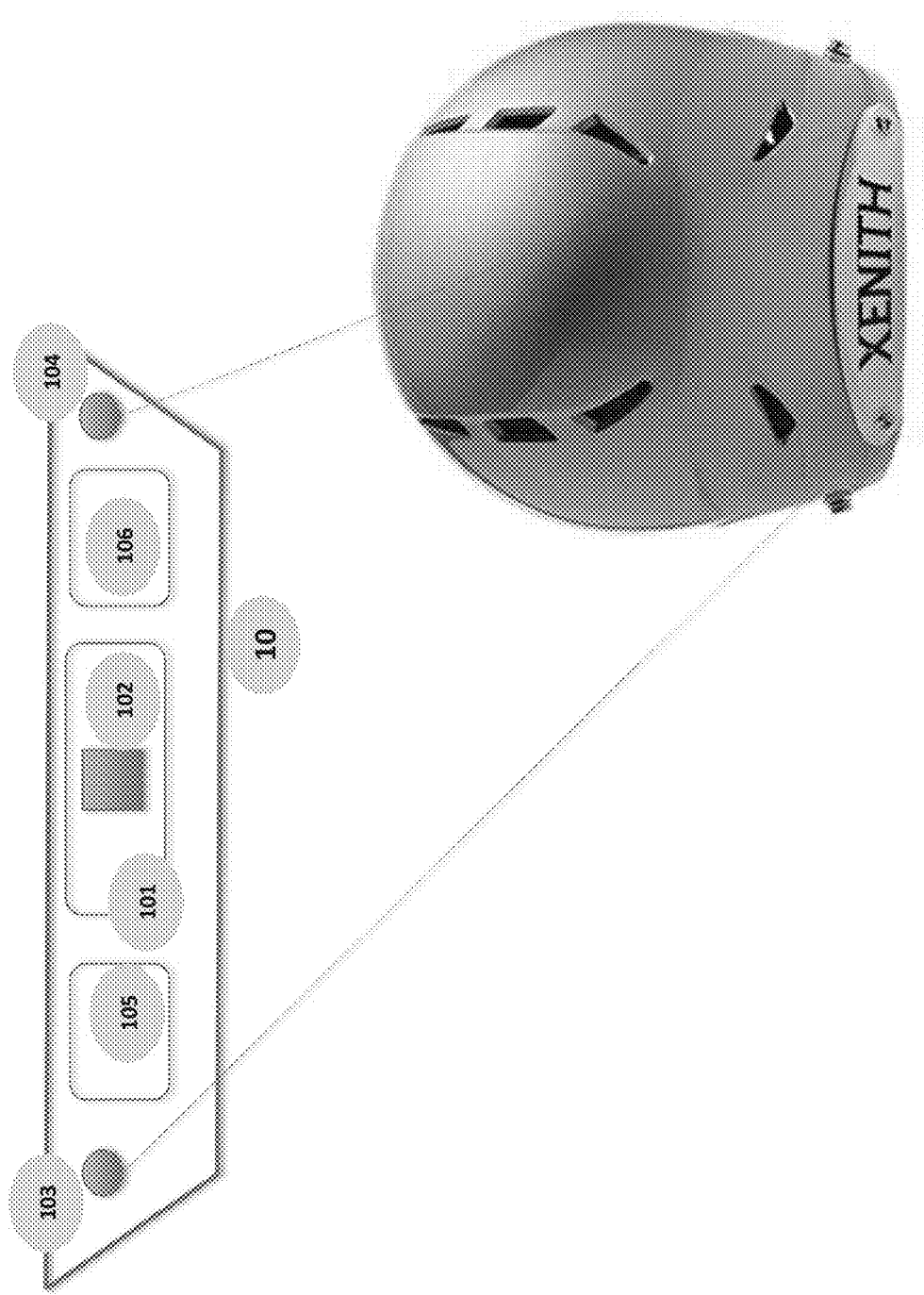

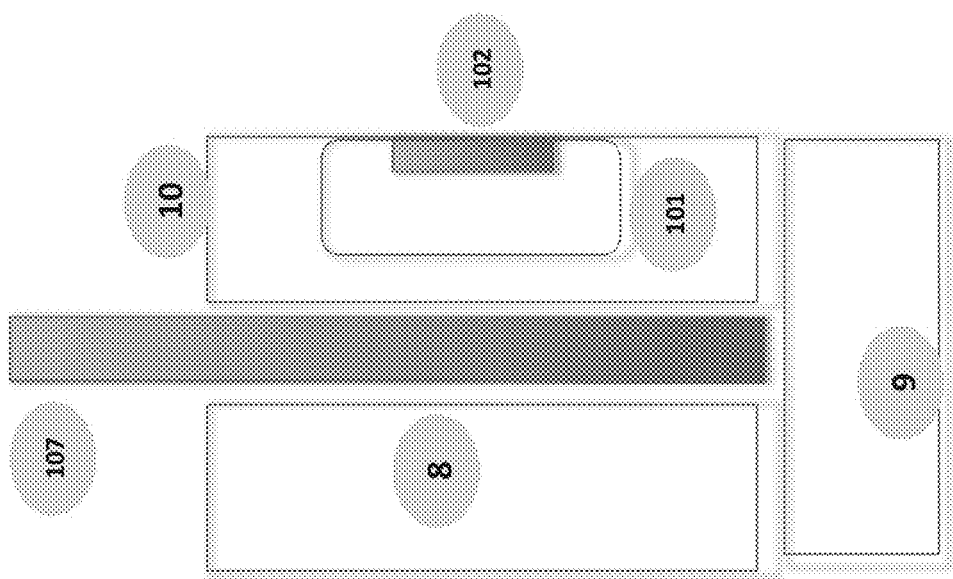

WEARABLE HELMET WITH INTEGRATED PERIPHERALS

RELATED APPLICATIONS

Under provisions of 35 U.S.C. § 119(e), the Applicant claims the benefit of, and incorporates by reference, in their entirety:
  a. U.S. provisional application No. 62/026,475, filed Jul. 18, 2014, entitled "Wearable Helmet System with Integrated Peripherals" in the name of Saeed Z. Anwar and Tenzing P. Tshering; and
  b. U.S. provisional application No. 62/059,378 entitled "Point Of View Video Processing and Curation Platform,", filed on Oct. 3, 2013 in the name of Saeed Z. Anwar and Tenzing P. Tshering.

The present disclosure is a continuation-in-part of related applications, the disclosure of which is incorporated herein, in its entirety:
  a. U.S. non-provisional application Ser. No. 14/565,915, entitled "Point Of View Multimedia Platform," filed Dec. 10, 2014 in the name of FieldCast, LLC; and
  b. U.S. non-provisional application Ser. No. 14/612,671, entitled "Point of View Multimedia Provision," filed Feb. 3, 2015 in the name of FieldCast, LLC.

It is intended that each of the referenced applications may be applicable to the concepts and embodiments disclosed herein, even if such concepts and embodiments are disclosed in the referenced applications with different limitations and configurations and described using different examples and terminology.

FIELD OF DISCLOSURE

The present disclosure generally relates to content capture and delivery in a networked environment.

BACKGROUND

Conventional helmet systems may merely provide a helmet integrated with a single camera. The conventional integrated helmet may not include speakers, microphones, or any other sensing devices. Furthermore, the helmet cannot be easily disassembled in order to, for example, repair or maintain the integrated camera, which are stored in a hard plastic casing that may be prone to damage upon impact. The batteries of conventional integrated helmet may be lithium-ion batteries that are configured internally. As lithium-ion batters are extremely sensitive to high-temperatures, the conventional integrated helmet may present the risk of potential over-heating and the subsequent dangers of combustion. Furthermore, heat causes lithium-ion battery packs to degrade much faster than they normally would.

BRIEF OVERVIEW

A wearable helmet system with integrated peripherals may be provided. This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

A wearable helmet system with integrated peripherals may be provided. In some embodiments, the integrated peripherals may be provided without a helmet, but configured to be adapted into a helmet to form a helmet system consistent with embodiments of the present disclosure. The helmet system may comprise a helmet adapted for sports play. The helmet may be integrated with a plurality of peripheral devices such as, for example, but not limited to, at least one camera configured to capture video data, at least one microphone configured to capture audio data, a communications module, a power module, and a processing module. The processing module is configured to control an operation of the integrated peripheral devices based on, for example, but not limited to, instructions received via the communications module and a location of the helmet.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings:

FIG. 6E illustrates another embodiment of a component housing;
FIG. 7A illustrates another embodiment of a webbing attachment means;
FIG. 7B illustrates another view of an embodiment of the webbing;

DETAILED DESCRIPTION

Figure 1:
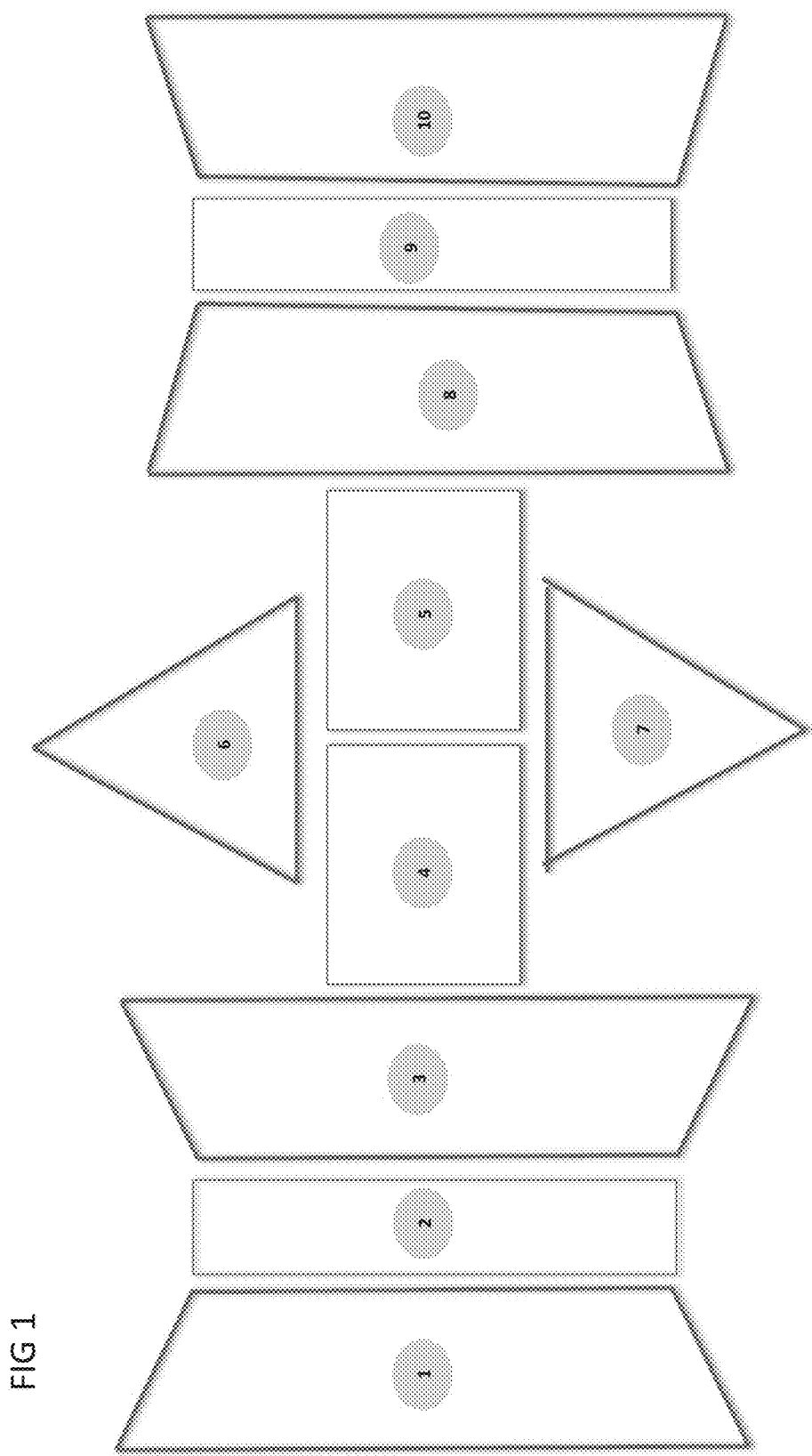
FIG. 1 illustrates one embodiment of a webbing.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. As should be understood, any embodiment may incorporate only one or a plurality of the above-disclosed aspects of the display and may further incorporate only one or a plurality of the above-disclosed features. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, although many portions of the present disclosure are written with the reference to embodiments comprising a football helmet, it should be understood that the wearable helmet system of the present disclosure may be adapted and applied in many different environments, including, but not limited to, sports, medical, military, recreational, mapping, and many other compatible uses.

I. Overview

Consistent with embodiments of the present disclosure, a wearable helmet system with integrated peripherals may be provided. This overview is provided to introduce a selection of concepts in a simplified form that are further described below. This overview is not intended to identify key features or essential features of the claimed subject matter. Nor is this overview intended to be used to limit the claimed subject matter's scope. The wearable helmet system with integrated peripherals may be used by individuals or companies for point of view multimedia content capture and transmission.

The helmet system may be integrated with a Point of View Multimedia Platform as disclosed by the related applications listed in the Related Applications section of this disclosure. The multimedia content captured and transmitted by the helmet system may include video, audio, location and telemetry data. The system may be further configured to capture other information, including, for example, motion and location data. The content capture and transmission may be configured to occur, in certain embodiments, from a sporting venue, on a playing field, and/or in conjunction with a live-broadcasting event such as, for example, a football game. In a football game, a football player may wear the integrated helmet system on his head in substantially the same manner as a convention helmet would be worn. In turn, the helmet of the present disclosure would enable the Point of View Multimedia Platform to employ the football player as a multimedia content capturing and transmission source.

Accordingly, embodiments of the present disclosure may provide a helmet that can be securely mounted on, and be easily removed from, the wearer. The helmet may be integrated with a plurality of sensing devices, including, but not limited to, cameras, microphones and speakers (hereinafter referred to as "integrated peripherals"). The integrated peripherals may be grouped together and easily attachable and detachable to helmets or users.

The cameras and microphones may be configured to provide point of view video capture. (See U.S. provisional application No. 62/059,378, the disclosure of which is incorporated by reference in its entirety). In addition, when used in conjunction with the speaker, the helmet may be used as a two-way communications system.

In various embodiments, the helmet may be configured with additional electronics for telemetry data collection (e.g. acceleration, temperature, gyroscopic sensors, motion detectors, biometric sensors, etc.) and Geo-location information. Moreover, the telemetry data collected may be streamed through the communications module as telemetry data along with its own metadata. Metadata may include, for example, but not limited to, player ID information, and be communicated in a separate stream. (See U.S. provisional application No. 62/059,378, the disclosure of which is incorporated by reference in its entirety). Moreover, in some embodiments, the telemetry data may be employed in the provision of CGI renderings. (See U.S. non-provisional application Ser. No. 14/565,915, the disclosure of which is incorporated by reference in its entirety.)

A helmet consistent with embodiments of the present disclosure may be manufactured from various materials comprising, but not limited to, for example clothing, elastomer foam, and thermoplastic elastomers. The integrated peripherals may be encased inside the thermoplastic elastomers, which may be encased inside the elastomer foam. The integrated peripherals may be interconnected using industry standard electronic wiring, ribbon cable, and the like.

The location, as obtained by a location detection module, of the system (or grouped integrated peripherals) may be directly associated with how the system operates or how the content captured by the system is subsequently processed. (See U.S. provisional application No. 62/059,378, the disclosure of which is incorporated by reference in its entirety).

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and sub-combinations described in the detailed description.

II. Configuration

Embodiments of the present disclosure may provide a wearable helmet system comprising a plurality of integrated peripherals. Other embodiments of the present disclosure may provide systems that comprise a plurality of peripherals that are configured to be integrated into a helmet. Yet further embodiments of the present disclosure may provide methods for integrating a plurality of peripherals into a helmet.

In some embodiments, the system (interchangeably referred to as apparatus or device throughout this disclosure) may be installed in between the hard shell of the helmet and the helmet cushioning fibers. In further embodiments, the system may be mounted on a wearer-facing side the helmet (the interior). In other embodiments, the wearable system may be mounted on the outside of the helmet (external surface) by employing, for example, screws, snaps and/or Velcro. The present disclosure further anticipates a hybrid approach wherein all three of the aforementioned variations, or partial combinations thereof, may be employed in the helmet integration. For instance, various components of the system mounted on the inside, outside, and inner configurations of the helmet.

The system may be designed to be easily removed from one helmet and placed into another helmet. The system may have a unique identifier so that it may be associated with the player that wears the system. The player-system association may occur on a remote, server end and be controlled and modified by an operator at any time. In this way, users (e.g. players) can interchange systems with different helmets during, for example, a football game.

The integrated peripherals consistent with the embodiments of the present disclosure may comprise a plurality of devices configured capture, for example, audio/video content, movement sensing devices, temperature sensing devices, and location data (hereinafter referred to as the "capturing devices"). In some embodiments, the cameras may be multi-depth focus cameras configured to detect multiple light fields. One such example of a camera may be the multi-array camera from Pelican Systems.

The integrated peripherals may further comprise a communications module comprising, for example, Wi-Fi and/or Bluetooth devices configured to stream the data. The data may be streamed in accordance to systems and methods disclosed in the Point of View Multimedia Platform applications.

Various embodiments of the integrated helmet system may comprise a processing module coupled to the capturing devices and the communications module. In this way, the processing unit may communicate, bi-directionally, data captured by the system as well as operational data received from a remote location. The processing module may comprise a micro-embedded processor placed within the wearable system. For example, the processing module may comprise a system on a chip (SOC) such as the SnapDragon from Qualcomm, the Ambarella A9, and other like chipsets. A quantity of processors (or processing modules) that may be integrated into the helmet may depend on a quantity of capturing devices.

The integrated helmet system may further comprise a power module. The power module may include, for example, a battery. The battery may be replaceable and/or rechargeable. The embodiments where the battery is chargeable, the power module may include a port for receiving a power supply.

In various embodiments, the battery may be integrated into the helmet itself. For example, the battery may be placed on the back of the helmet, on an external surface. In other embodiments, where longer battery life is required, the battery may be external to the integrated helmet system in order to, for example, accommodate larger battery size. In these embodiments, the external battery may be worn on body of the helmet wearer (e.g., in a carrying compartment or back pack), and connected to the helmet with wiring.

Embodiments of the present disclosure may provide a webbing for encasing integrated peripherals. FIG. 1 illustrates an example of webbing that may be provided. The webbing may be comprised of, but not limited to, for example, sewn clothing, elastomer foam, and thermoplastic elastomers. The thermoplastic elastomers may be designed to snap through openings of the helmet and mount to external and/or internal surfaces of the helmet.

Each thermoplastic elastomer may be designed to provide protection for the integrated peripherals encased therein. The shape of the webbing may be customized to conform to the physical properties of various helmet designs. Accordingly, although the webbing is disclosed herein to be adapted to a football helmet, it should be understood that the webbing may be adapted to conform to different types of headgear, including, for example, baseball, hockey, lacrosse, and various other helmet types.

Consistent with embodiments of the present disclosure, the webbing may consist of, for example ten pieces, as represented by items 1 through 10 in FIG. 1. Item 1 may be an elastomer foam that is installed on, for example, the front of the helmet and under the upper portion of the facemask. As will be described in greater detail in FIGS. 2A, 2B and 3, it may comprise an embedded thermoplastic elastomer housing for storing an integrated peripheral device such as, for example, a camera.

Item 2 may be an elastomer foam that bridges the front of the helmet to a webbing located on the inside of the helmet. This, too, may be embedded with a thermoplastic elastomer housing configured with a camera and, in various embodiments, a microphone.

Item 3 may be an elastomer foam positioned on the inside of the helmet. The elastomer foam may be comprised of a thermoplastic elastomer material to embed the wiring for the cameras and microphone. These wires may continue to the item 4, which may be an elastomer foam to house the thermoplastic material for a processing module (e.g., computing device). The processing module may comprise a PCB board for the System-on-a-Chip (SOC) and related electronics, which may be further detail with reference to FIG. 4.

Similarly, item 5 may be an elastomer foam to house the thermoplastic elastomer material for an additional processing module. The additional processing module may comprise an additional PCB board for an additional SOC related electronics. Items 4 and 5 may share the input-output to all the integrated peripherals (e.g., cameras, speakers and microphones). In some embodiments, the processing module housed in item 4 may be configured to operate a first set of capturing devices (e.g., front-facing cameras and microphone), while the additional processing module housed in item 5 may be configured to operate a second set of capturing devices (e.g. side and rear facing cameras and speakers). The integrated helmet system may be designed with different configurations based on different peripheral device integration layouts.

Item 6 and item 7 may be the elastomer foam that is positioned on the interior of the helmet in a way that, when the helmet is worn, the foam may go around the side of the wearer's head and ears. Item 6 may be positioned to the right side of the wearer's head, while item 7 may be positioned to the left side of the wearer's head. As will be detailed with reference to FIG. 8, both items 6 and 7 may be embedded with thermoplastic elastomer housing in which cameras and speakers may be installed.

Item 8 may be an elastomer foam on the interior back-side of the helmet with thermoplastic elastomer material to embed the wiring for a back camera. The wiring may continue to the processing module of items 4 or 5. Item 9 may be an elastomer foam that bridges the foam of item 8 to a webbing located inside of the helmet. Similarly, item 9 may be comprised of a thermoplastic elastomer material to embed the wiring for the back camera, which may continue to the processing module of items 4 or 5.

Item 10 may be an elastomer foam that sits on the back of the helmet. As will be described in FIGS. 7A and 7B, it may be made from elastomers but may comprise an embedded thermoplastic elastomer housing for the back camera.

Figure 2A:
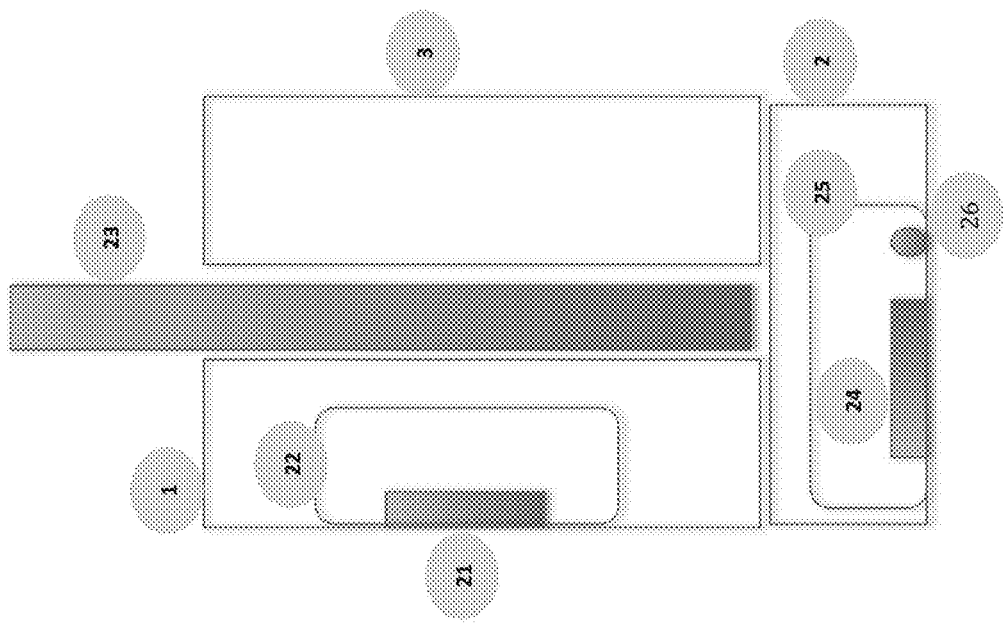
FIG. 2A illustrates another view of an embodiment of the webbing.

FIG. 2A describes the elastomer foam webbing mounted on the front of the helmet shown by item 23. The webbing components from FIG. 1, items 1, 2, and 3, may be repeated in FIGS. 2A and 2B to show their positions mounted relative to the front of the helmet, item 23.

Again referring to FIG. 2A, item 22 may be the thermoplastic elastomer that houses the frontal camera, item 21. This frontal camera may represent the main view of the play for most players on the field. The wires from this camera may traverse through item 22, item 2 and item 3. These wires may connect with the processing module embedded within FIG. 1, item 4. The camera, item 21, may be situated such that its view is not obstructed by the face guard helmet. The camera may be mounted in the thermoplastic elastomer-housing, item 22, such that when pressure is applied; the pressure will dissipate by the thermoplastic housing.

Figure 2B:
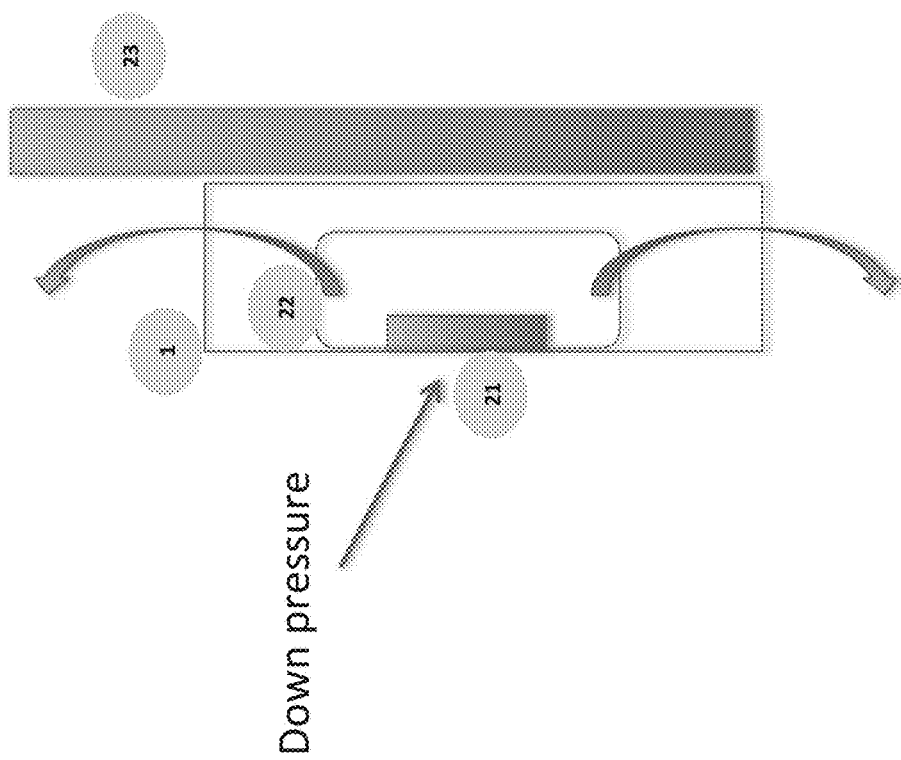
FIG. 2B is a vector diagram associated with an embodiment of the webbing.

To describe the pressure dissipation, a vector diagram is shown in FIG. 2B. For example, when pressure is applied to item 21, this pressure may be passed from the camera to the thermoplastic elastomer housing, item 22. Thermoplastics elastomers may elongate as shown by the arrows. Such elongation may absorb the pressure applied to the camera, thereby providing a level of protection to the actual camera from breaking. In some embodiments, the face guard mask may also provide a second front of protection. For example, because the face guard mask may protrude from the top of the helmet, the protruding portion may stop the camera from receiving a direct impact.

In FIG. 2A, item 25 shows another thermoplastic elastomer embedded in item 2. This thermoplastic elastomer may house a camera, item 24, and a microphone, item 26. This camera may be configured so as to capture a wearer's eye movements as well as eye dilation in case of injury, stress and facial expressions. Accordingly, the thermoplastic elastomer may be shaped such that the camera is slightly angled towards the eyes. The microphone may be used for multiple applications, including, but not limited to, for example communications with the coaching staff and medical staff, as well as general audio capturing for transmission to the Point of View Multimedia Platform.

Figure 3:
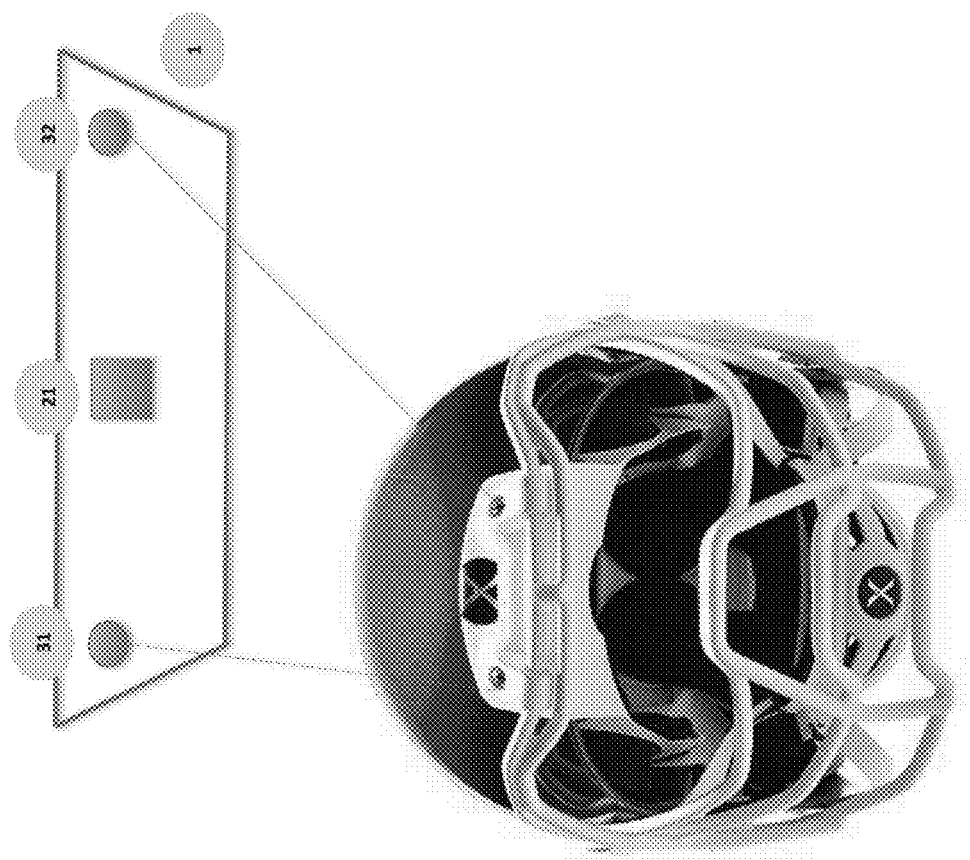
FIG. 3 illustrates an embodiment of a webbing attachment means.

FIG. 3 illustrates an embodiment of an attachment of the elastomer foam webbing to the front of the helmet. In FIG. 3, items 31 and 32 may be the screw positions where the face guard may be attached to the helmet. In some embodiments, the webbing may be secured to the helmet using these screw positions with the same screw as for the face guard. In other embodiments, snaps or Velcro may accommodate screws for the face guard assembly.

Figure 4:
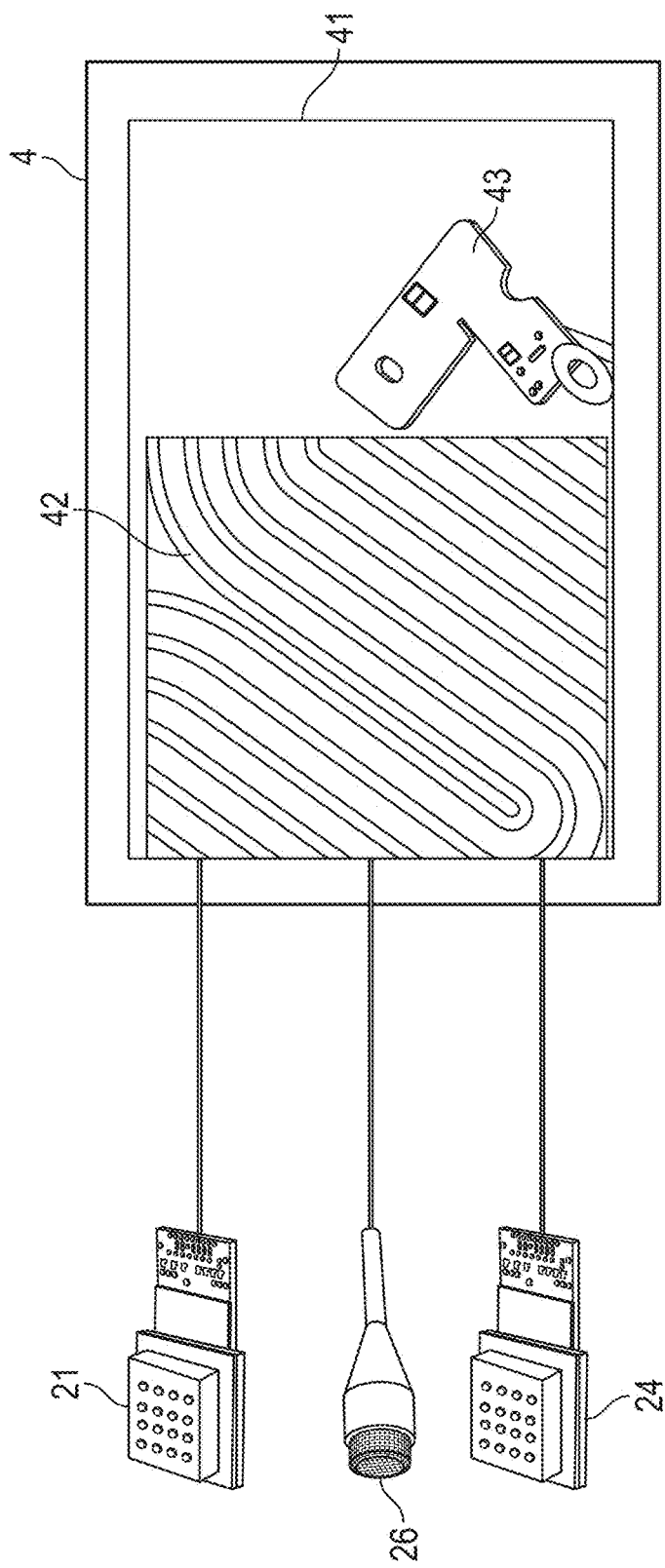
FIG. 4 illustrates an embodiment of a component housing.

FIG. 4 describes the portion of the elastomer foam webbing that houses the electronics for the front of the helmet. In FIG. 4, item 4 shows the elastomer foam that may be stitched to the webbing. This elastomer may contain the thermoplastic elastomer-housing, item 41, for the processing module (e.g., SOC and PCB board and related electronics). In some embodiments, the processing module may be alternatively housed in the elastomer foam webbing at the back of the helmet, FIG. 1, item 10.

Figure 5:
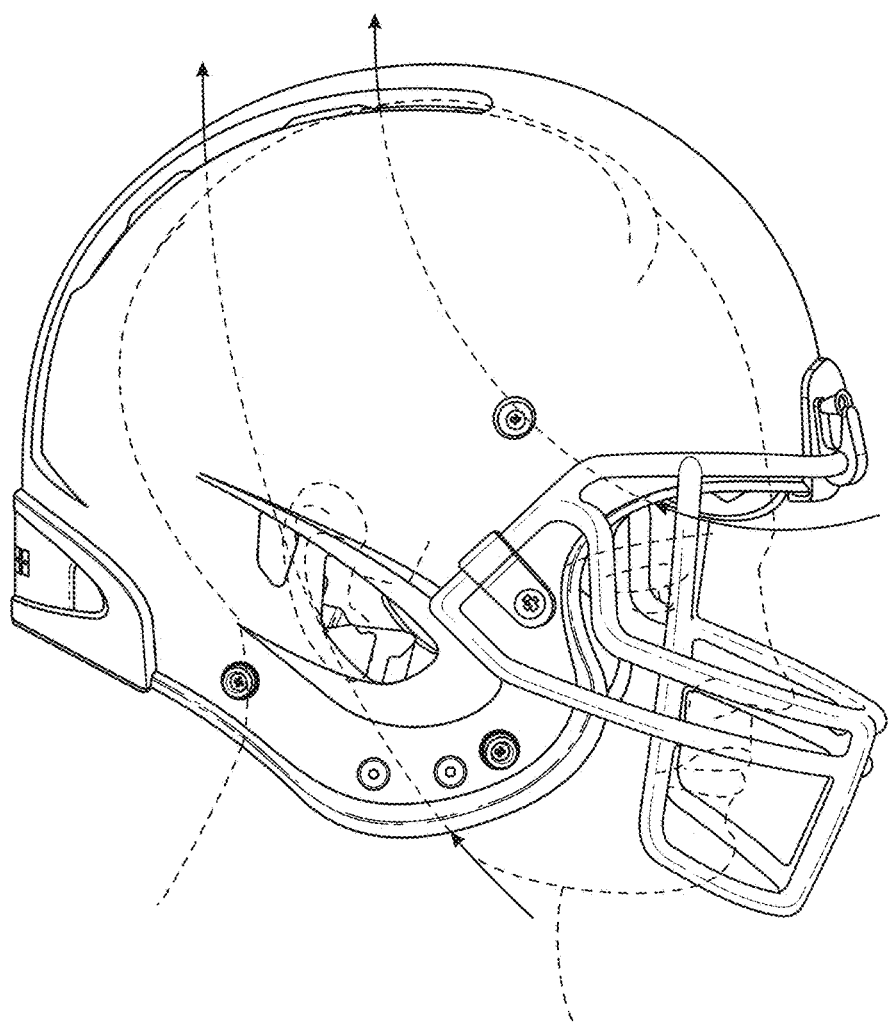
FIG. 5 is an air-flow diagram of an embodiment of a helmet.

A heat exchanger, item 43, may be located at an extension from the thermoplastic elastomer housing. This heat exchanger may draw the heat from the processing module components (e.g. the PCB board) and dissipate the heat through the helmet. Internal helmet airflow is shown in FIG. 5. Airflow from the ear region and from the face region may push air to the top and back towards the vents. In this way, the hot air from the heat exchanger may be dissipated through the vents in the helmet.

In various embodiments, the processing module may further house a plurality of sensors, such as, for example, but not limited to, GPS location, Accelerometers, RFID, and the like. In turn, each capturing device (e.g., camera, microphone, and other sensor data) may be time-synchronized via, for example, a processor (e.g., the SOC) using timestamp information.

In some embodiments, a proximity sensing device, such as, for example, the RFID may be used to operate the capturing devices in a power-efficient manner. For example, RFID tags may be positioned in proximity to a playing field (e.g. players' bench) in which the integrated helmet system is being worn. Then, when the wearer of the integrated helmet system goes off the field and is within 6 ft of the bench where the RFID tags are placed, the processing module may be operative to switch the capturing devices and communications modules to a standby/low-power mode to preserve battery power. The present disclosure anticipates that other remote management techniques may be used to place electronics in standby/low-power mode.

In yet further embodiments, the location of the device (grouped peripherals, and as detected by the location detection module) may be correlated with its operation based on a point of view perspective a centralized server is attempting to provide. (See U.S. provisional application No. 62/059,378, the disclosure of which is incorporated by reference in its entirety, reference to "SPORT OF VIEW" examples).

Referring back to FIG. 4, item 43 shows the Wi-Fi antenna, which may be a part of the communications module. The Wi-Fi antenna may be used to stream the audio and video over Wi-Fi, although Bluetooth communication devices and protocols may be used as well. The shape of this antenna may be similar to that found in smart cell phones that require good Wi-Fi connections, such as, for example, the Apple iPhone. Items 21, 24, and 26 (i.e., the two cameras towards the front of the helmet and the microphone) have been detailed in the description corresponding to FIG. 2A.

Figure 6A:
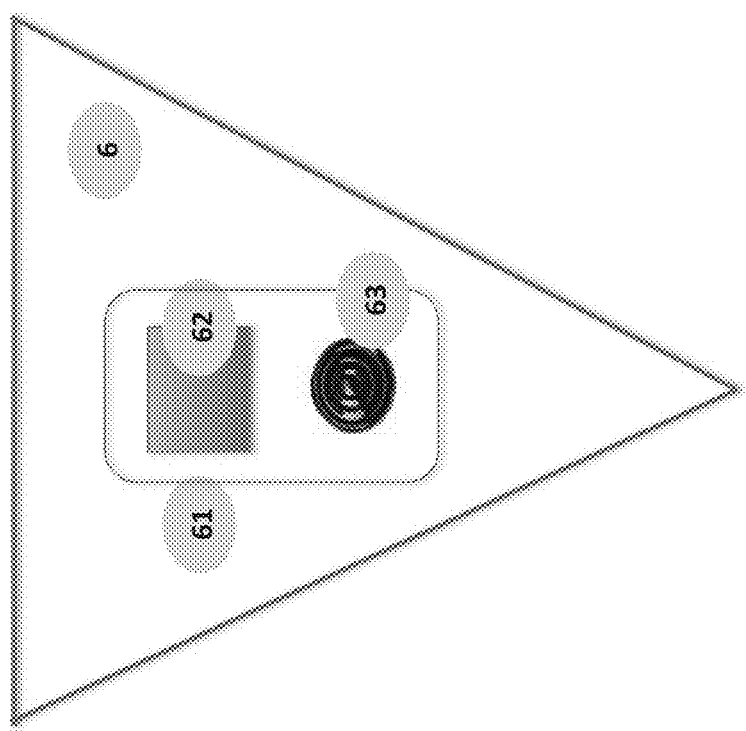
FIG. 6A illustrates an embodiment of a webbing containing a speaker and a camera.

FIG. 6A illustrates one possible embodiment of an elastomer foam webbing for a right-side speaker and camera. In some instances, the webbing may wrap under the side of the helmet and be attached to the outside of the helmet with, for example, Velcro. Accordingly, FIG. 6A illustrates an example of the structural integrity of the helmet with a camera placed inside an opening of the helmet. Further details for this example are provided with reference to FIG. 6B.

In FIG. 6A, item 6 may be the elastomer foam forming part of the webbing. Item 61 may be the thermoplastic elastomer housing which houses the camera, item 62, and the speaker, item 63. The camera may be positioned outwards through the opening of the helmet, while the speaker may be directed towards the wearer's head. In the example illustrated in FIG. 6A, the elastomer foam does not cover the ear holes in the helmet, as the wearer must still be enabled to hear from players within the field.

Figure 6B:
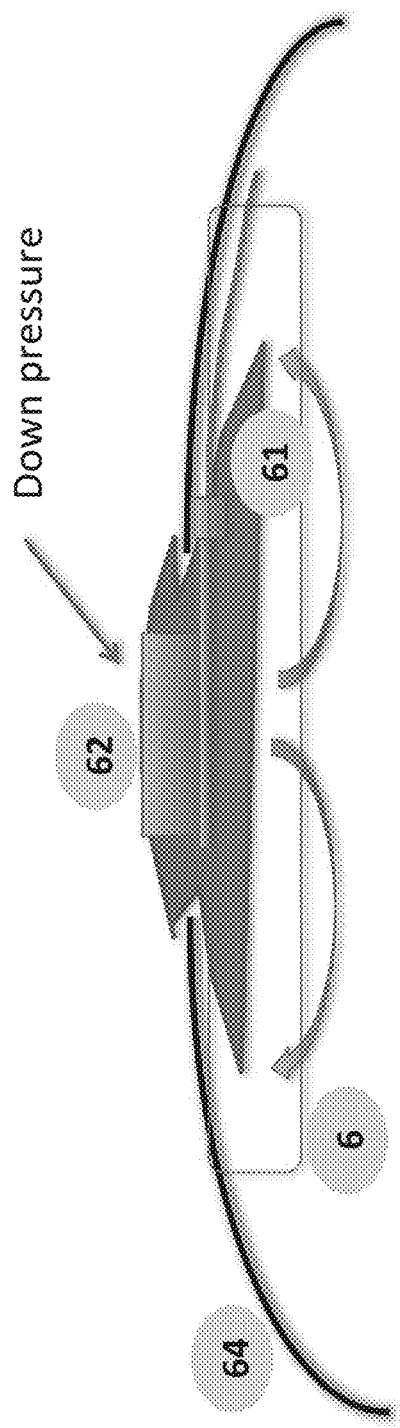
FIG. 6B is a vector diagram associated with an embodiment of a webbing containing a speaker and a camera.

FIG. 6B shows how the webbing, item 6, may be positioned in relation to the helmet shell, item 64. The elastomer foam is shown as item 6, and the embedded thermoplastic elastomer is shown as item 61, in which the camera, item 62, may be embedded. The thermoplastic elastomer may be shaped such that it may snap through the helmet opening and straddle the sides of the opening of the helmet without protruding out of the opening. In this way, when downward pressure from an impact is applied to the camera, the thermoplastic elastomer may absorb the pressure, which may elongate the thermoplastic elastomer on the inside of the helmet as shown by the arrows. This may protect the camera from breaking.

In some embodiments, it may be preferred to place cameras in position where all the angles from each camera overlap to provide a hemispheric view. A hemispheric view is described in greater detail in the Point of View Multimedia Platform related applications. Since the helmet may not always be in the shape of a ball, FIGS. 6C and 6D show some potential placements of the cameras.

Figure 6C:
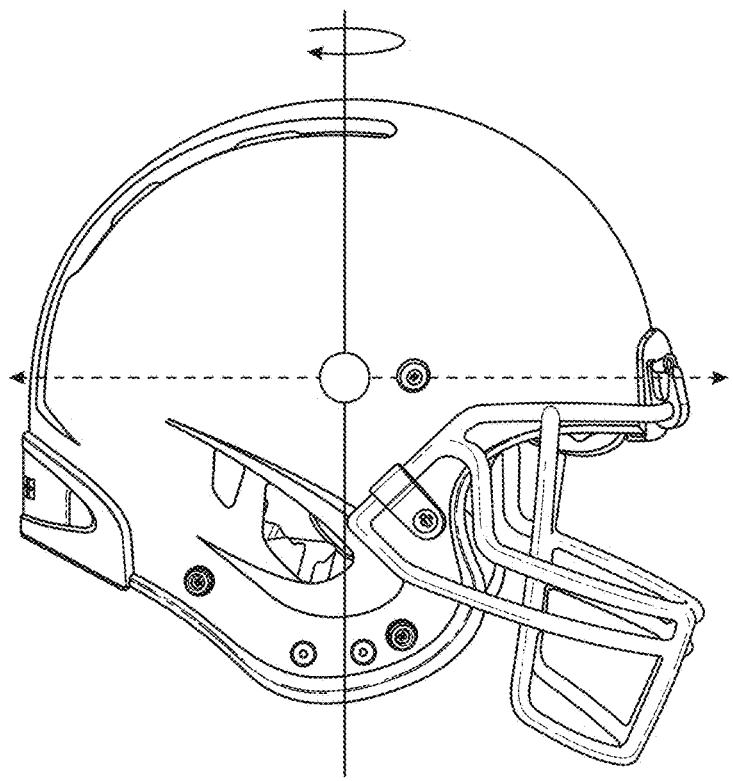
FIG. 6C illustrates an embodiment of a component alignment on a helmet.
Figure 6D:
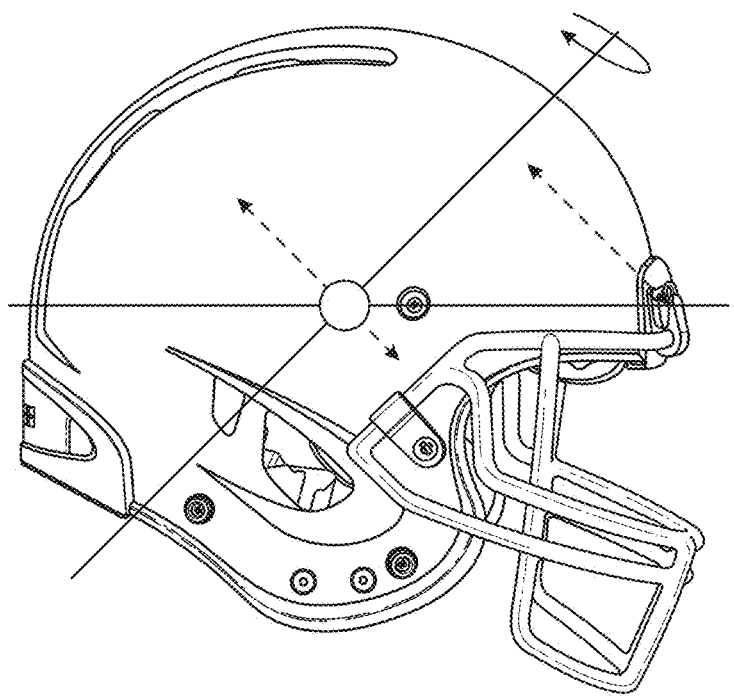
FIG. 6D illustrates another embodiment of a component alignment on a helmet.

In FIG. 6C, the camera may aligned with the front and back cameras. In this way, when the content captured by the cameras is stitched together, a panoramic view may be provided around a vertical axis, relative to the ground, to represent the left to right motion. In FIG. 6D, the camera may aligned so that when a receiver running to receive the ball lifts his head, the resultant rotation of the helmet, when coupled with the captured and stitched content of the cameras, may create a panoramic view of the incoming ball.

The placement of the side camera may be configured to accommodate two primary motions. A first motion may be the left to right movement of the head (e.g., a quarterback at a snap, a quarterback running backwards, and the like.). A second motion may be the turning the head of a receiver to, for example, to catch the ball.

The webbing for the left side of the head represented by FIG. 1, item 7, may be built similarly to the webbing on the right side represented by FIG. 1, item 6. Accordingly, FIG. 6E represents one embodiment of the elastomer foam webbing for the wearer's left speaker and camera. In some embodiments, the webbing may wrap under the side of the helmet and be attached to the outside of the helmet with, for example, Velcro.

FIG. 7A shows an embodiment of the elastomer foam webbing that goes on the external-back portion of the helmet. In some embodiments, the elastomer foam, item 10, may attach to the back of the helmet with, for example, screw or snap attachments as shown by items 103 and 104. Embedded within the foam may be the thermoplastic elastomer housing, item 101, for the camera, item 102. The alignment of the back camera is illustrated in the description corresponding to FIG. 6C. In FIG. 7, items 105 and 106 illustrate the thermoplastic elastomer housing for the batteries.

The batteries that may be used to power the integrated peripherals of the integrated helmet system should be of sufficient capacity to last at least the duration of the event in which the integrated system is employed. The capacity of batteries may be, for example, smaller when used in conjunction with RFID or other remote power management techniques that place the electronics in standby/lower-power mode and preserve battery life, as described with reference to FIG. 4 and FIG. 8.

Figure 8:
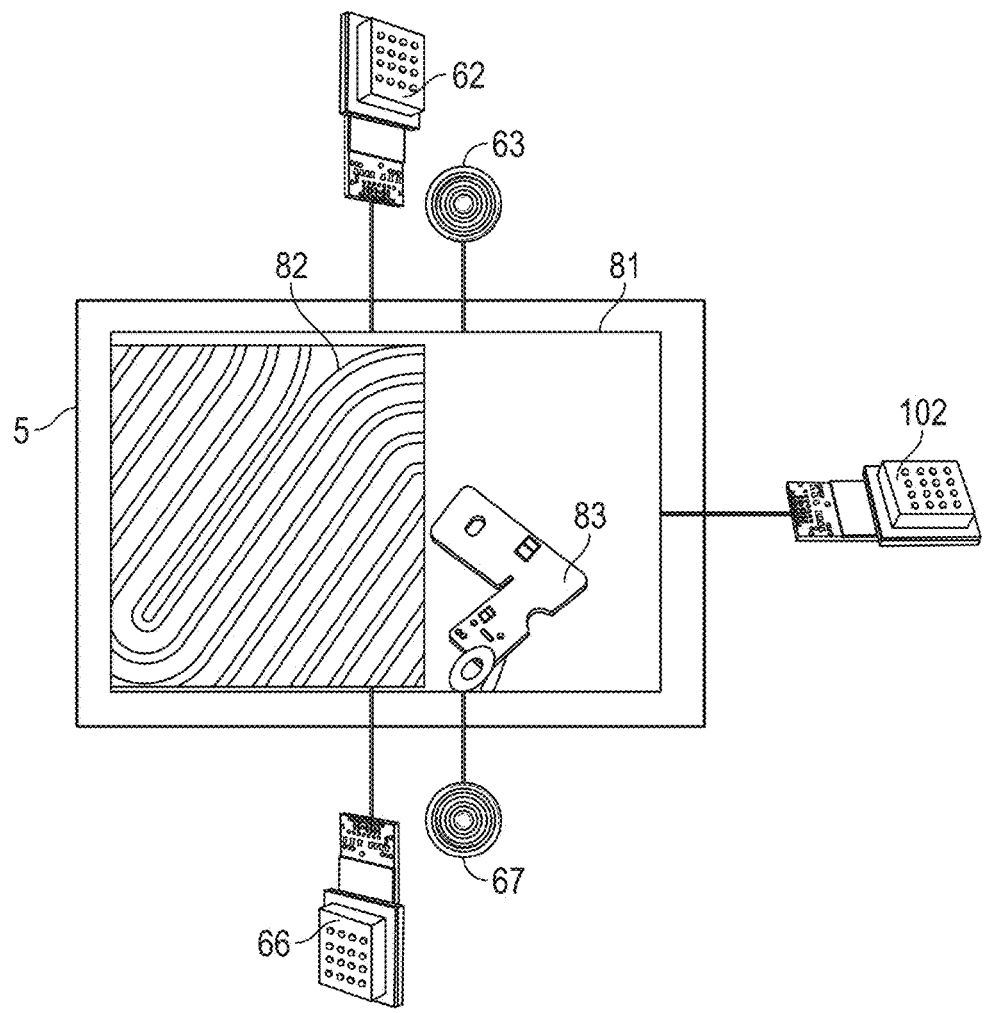
FIG. 8 illustrates yet another embodiment of a component housing.

FIG. 7B shows how the back camera, item 102, may be positioned relative to the helmet shell, item 107. Item 101 is the thermoplastic elastomer housing for the back camera. The elastomer foam on the back, item 10, may be connected with the rest of the webbing with items 9 and 8, respectively. FIG. 8 illustrates the elastomer foam webbing that houses the second set of electronics for the side and back cameras, as well as the speakers.

FIG. 8 describes the portion of the elastomer foam webbing that houses the electronics for the back of the helmet. In FIG. 8, item 5 shows the elastomer foam that may be stitched to the webbing. This elastomer may contain the thermoplastic elastomer-housing, item 81, for the processing module (e.g., SOC and PCB board and related electronics). In some embodiments, the processing module may be alternatively housed in the elastomer foam webbing at the back of the helmet, FIG. 1, item 10.

Extending from the thermoplastic elastomer housing may the heat exchanger, item 82, for the processing module. This heat exchanger may draw the heat from the processing module components (e.g. the PCB board) and dissipate it inside the helmet. Internal helmet airflow is shown in FIG. 5. Airflow from the ear region and from the face region may push air to the top and back towards the vents. In this way, the hot air from the heat exchanger may be dissipated through the vents in the helmet.

FIG. 8, items 62, 63, 66 and 67 are described in the description for FIGS. 6A and 6E, respectively. These are the two cameras and speakers on the sides of the helmet. FIG. 8, item 102 is described in the description for FIG. 7. This is the camera in the back of the helmet.

FIG. 8, item 83 shows a Wi-Fi antenna. In some embodiments, a Wi-Fi antenna may be used to stream data, including, for example, but not limited to, the audio, video, and sensor data, over Wi-Fi. The shape of the antenna may be similar to that found in smart cell phones that require good Wi-Fi connections, such as the Apple iPhone. In some embodiments, a Bluetooth connection may be used instead of, or in conjunction with, Wi-Fi communication. The data may be streamed to centralized server where the data may be processed. Although data processing is disclosed in the Point of View Multimedia Platform applications incorporated by reference, FIG. 9 illustrates a computing device, which in some embodiments, may be contained within the processing module to pre-process the captured data.

Figure 9:
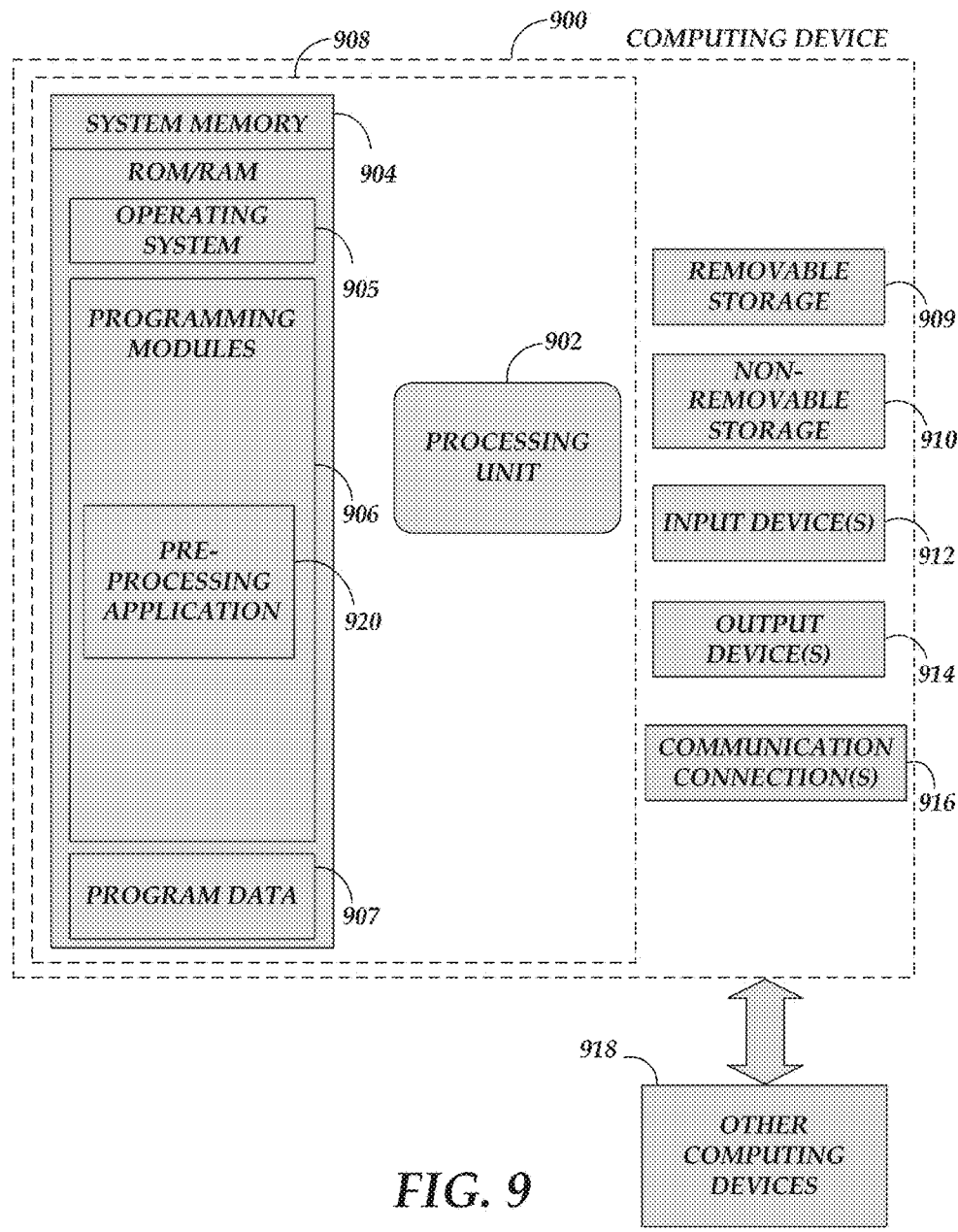
FIG. 9 is a block diagram of a system including a computing device that may be used in accordance to embodiments of the present disclosure.

FIG. 9 is a block diagram of a system including computing device 900. Consistent with an embodiment of the disclosure, the aforementioned memory storage and processing unit may be implemented in a computing device, such as computing device 900 of FIG. 9. Any suitable combination of hardware, software, or firmware may be used to implement the memory storage and processing unit. For example, the memory storage and processing unit may be implemented with computing device 900 or any of other computing devices 918, in combination with computing device 900. The aforementioned system, device, and processors are examples and other systems, devices, and processors may comprise the aforementioned memory storage and processing unit, consistent with embodiments of the disclosure.

With reference to FIG. 9, a system consistent with an embodiment of the disclosure may include a computing device, such as computing device 900. In a basic configuration, computing device 900 may include at least one processing unit 902 and a system memory 904. Depending on the configuration and type of computing device, system memory 904 may comprise, but is not limited to, volatile (e.g. random access memory (RAM)), non-volatile (e.g. read-only memory (ROM)), flash memory, or any combination. System memory 904 may include operating system 905, one or more programming modules 906, and may include a program data 907. Operating system 905, for example, may be suitable for controlling computing device 900's operation. In one embodiment, programming modules 906 may include a pre-processing application 920. Furthermore, embodiments of the disclosure may be practiced in conjunction with a graphics library, other operating systems, or any other application program and is not limited to any particular application or system. This basic configuration is illustrated in FIG. 9 by those components within a dashed line 908.

Computing device 900 may have additional features or functionality. For example, computing device 900 may also include additional data storage devices (removable and/or non-removable) such as, for example, magnetic disks, optical disks, or tape. Such additional storage is illustrated in FIG. 9 by a removable storage 909 and a non-removable storage 910. Computer storage media may include volatile and nonvolatile, removable and non-removable media implemented in any method or technology for storage of information, such as computer readable instructions, data structures, program modules, or other data. System memory 904, removable storage 909, and non-removable storage 910 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 900. Any such computer storage media may be part of device 900. Computing device 900 may also have input device(s) 912 such as a keyboard, a mouse, a pen, a sound input device, a touch input device, etc. Output device(s) 914 such as a display, speakers, a printer, etc. may also be included. The aforementioned devices are examples and others may be used.

Computing device 900 may also contain a communication connection 916 that may allow device 900 to communicate with other computing devices 918, such as over a network in a distributed computing environment, for example, an intranet or the Internet. Communication connection 916 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 904, including operating system 905. While executing on processing unit 902, programming modules 906 (e.g., pre-processing application 920) may perform processes including, for example, one or more of the methods as described above and in the related applications. The aforementioned process is an example, and processing unit 902 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

III. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. An apparatus comprising:
   at least one elastomer gasket configured to house electronics, wherein the at least one elastomer gasket is embedded within a foam structure surrounded by a hard shell, such that when a high energy impact occurs, the elastomer gasket housing depresses below the hard shell to protect the electronics;
   wherein the elastomer gasket houses components configured to enable:
      at least one camera to capture video data, wherein the at least one camera is configured to capture at least one of the following:
         a user's eye movements, and
         the user's eye dilation;
      at least one microphone configured to capture audio data;
      a bi-directional communications module;
      a location detection module;
      a power module; and
      a processing module, wherein the processing module is configured to control an operation of one of the following: the at least one camera, the at least one microphone, the at least one data communication device, and the power module, based on at least one of the following:
   a location of the apparatus,
   an instruction received from the communications module.

2. The apparatus of claim 1, wherein the processing module is configured to communicate captured data to an access point via the bi-directional communications module.

3. The apparatus of claim 2, wherein the processing module is configured to embed a timestamp as metadata to the captured data.

4. The apparatus of claim 1, further comprising at least one telemetry sensor.

5. The apparatus of claim 4, wherein the processing module is configured to calculate telemetry data and communicate the telemetry data via the bi-directional communications module along with the captured video data and the captured audio data.

6. The apparatus of claim 1, wherein the power module is configured to be adapted to an external source for charging a battery associated with the power module.

7. The apparatus of claim 1, further comprising a heat exchanger, wherein the heat exchanger is configured to draw heat from the processing module.

8. The apparatus of claim 1, wherein the helmet is configured to cause airflow to occur past the processing module positioned within an interior of the helmet.

9. The apparatus of claim 1, wherein the processing module is configured to reduce power usage based upon the location of the apparatus, wherein reducing the power usage comprises disabling at least one of the following:
the at least one camera configured to capture video data,
the at least one microphone configured to capture audio data, and
the bi-directional communications module.

10. The apparatus of claim 9, further comprising an RFID module, wherein the location is determined by a proximity to an RFID tag.

11. The apparatus of claim 1, wherein the at least one camera is a multi-depth focus camera configured to detect multiple light fields.

12. The apparatus of claim 1, wherein the bi-directional communications module utilizes at least one of the following: WiFi technology and Bluetooth technology.

13. The apparatus of claim 1, wherein the location detection module comprises Global Position System components.

14. The apparatus of claim 1, further comprising thermoplastic elastomers for containing the at least one camera and the at least one microphone.

15. The apparatus of claim 1, further comprising elastomer foam padding for containing the at least one camera and the at least one microphone.

16. An apparatus comprising:
at least one elastomer gasket configured to house electronics, wherein the at least one elastomer gasket is embedded within a foam structure surrounded by a hard shell, such that when a high energy impact occurs, the elastomer gasket housing depresses below the hard shell to protect the electronics;
wherein the elastomer gasket houses components configured to enable:
at least one camera to capture video data, wherein the at least one camera is configured to capture at least one of the following:
a user's eye movements, and
the user's eye dilation;
at least one microphone configured to capture audio data
a communications module;
a location detection module;
a power module; and
a processing module, wherein the processing module is configured to control an operation of one of the following: the at least one camera, the at least one microphone, the at least one data communication device, and the power module, based on at least one of the following:
a location of the apparatus, and
an instruction received from the communications module,
wherein a plurality of peripherals adapted for integration with a plurality of helmets, the plurality of peripherals comprising:
the at least one camera configured to capture video data;
the at least one microphone configured to capture audio data;
the power module configured to provide power for the peripherals;
the at least one bi-directional communication device;
the location detection device; and
the processing module; and
at least one casing for the plurality of peripherals adapted for integration into the plurality of helmets,
wherein the plurality of peripherals and the at least one casing are configured to enable at least one of the plurality of peripherals to be easily removed from a first helmet and placed into a second helmet, and
wherein the processing module coupled with the bi-directional communications device are configured to transmit a unique identifier to enable a remote server to associate players with the plurality of helmets.

17. The apparatus of claim 16, wherein the at least one casing comprises a webbing that attaches to any one of the plurality of helmets via at least one of the following:
snaps, hook-and-loop, and locking clamps.

18. The apparatus of claim 16, further comprising a thermoplastic foam wherein the thermoplastic foam is configured to cushion the plurality of integrated peripherals.

19. A system comprising:
at least one elastomer gasket configured to house electronics, wherein the at least one elastomer gasket is embedded within a foam structure surrounded by a hard shell, such that when a high energy impact occurs, the elastomer gasket housing depresses below the hard shell to protect the electronics;
wherein the elastomer gasket houses components configured to enable:
at least one camera to capture video data, wherein the at least one camera is configured to capture at least one of the following:
a user's eye movements, and
the user's eye dilation;
at least one microphone configured to capture audio data
a communications module;
a location detection module;
a power module; and
a processing module, wherein the processing module is configured to control an operation of one of the following: the at least one camera, the at least one microphone, the at least one data communication device, and the power module, based on at least one of the following:
a location of the apparatus,
an instruction received from the communications module,
a plurality of integrated peripheral adapted for integration into a helmet,
the plurality of integrated peripherals comprising at least one of the following:
the at least one camera configured to capture video data,
the at least one microphone configured to capture audio data,
the location detection module,
a proximity sensing device, and
at least one speaker;

a wireless access point in communication with the helmet, the wireless access point being configured to:
receive and transmit the audio data and the video data captured by the helmet, and
receive and transmit operational data to the processing module of the helmet,
wherein the processing module of the helmet is configured to operate the integrated peripherals of the helmet based at least in part on a location of the the plurality of integrated peripherals as detected by at least one of the following: the at least one proximity sensing device and the location detection module, wherein operating the integrated peripherals based on the location comprises disabling at least one of the integrated peripherals.

20. A wearable system to protect electronics from high energy impacts, the system comprising:
at least one elastomer gasket configured to house electronics, wherein the at least one elastomer gasket is embedded within a foam structure surrounded by a hard shell, such that when a high energy impact occurs, the elastomer gasket housing depresses below the hard shell to protect the electronics;
wherein the elastomer gasket houses components configured to enable:
at least one camera to capture video data, wherein the at least one camera is configured to capture at least one of the following:
a user's eye movements, and
the user's eye dilation;
at least one microphone configured to capture audio data
a communications module;
a location detection module;
a power module; and
a processing module, wherein the processing module is configured to control an operation of one of the following: the at least one camera, the at least one microphone, the at least one data communication device, and the power module, based on at least one of the following:
a location of the apparatus, and
an instruction received from the communications module.

* * * * *